United States Patent [19]

House

[11] Patent Number: 4,569,799

[45] Date of Patent: Feb. 11, 1986

[54] PROCESS FOR MAKING ORGANOPHILIC HUMATE DERIVATIVES

[75] Inventor: Roy F. House, Lafayette, La.

[73] Assignee: Venture Innovations, Inc., Lafayette, La.

[21] Appl. No.: 574,379

[22] Filed: Jan. 27, 1984

[51] Int. Cl.$^4$ .......................... C07C 91/26; C09F 7/14
[52] U.S. Cl. .......................... 260/501.15; 260/501.11; 260/404.5
[58] Field of Search ............ 260/501.15, 501.11, 260/404.5 PA

[56] References Cited

U.S. PATENT DOCUMENTS

| | | | |
|---|---|---|---|
| 2,850,492 | 9/1958 | Erskine et al. | 260/501.15 |
| 3,168,475 | 2/1965 | Jordan et al. | 260/501.11 |
| 3,232,870 | 2/1966 | Cowan et al. | 252/8.5 M |
| 3,281,458 | 10/1966 | Jordan et al. | 260/501.15 |
| 3,325,537 | 6/1967 | Beasley, Jr. et al. | 260/501.11 |
| 3,379,650 | 4/1968 | Beasley, Jr. et al. | 252/8.5 M |
| 3,425,953 | 2/1969 | Cowan et al. | 252/8.5 M |
| 3,494,865 | 2/1970 | Andrews, Jr. et al. | 252/8.5 M |
| 3,671,427 | 6/1972 | Andrews, Jr. et al. | 260/404.5 |
| 3,671,428 | 6/1972 | Kim | 252/8.5 M |
| 3,775,447 | 11/1973 | Andrews et al. | 260/404.5 PA |

*Primary Examiner*—Glennon H. Hollrah
*Assistant Examiner*—Raymond Covington

[57] ABSTRACT

The invention provides a novel process of preparing organophilic humate derivatives wherein: an aqueous solution of a humic acid-containing material is prepared with an alkali metal or ammonium base; an amine containing at least 16 carbon atoms and at least one functional group per molecule selected from the group consisting of primary amino, secondary amino, quaternary ammonium, and mixtures thereof, is mixed with the humate solution; an acid is mixed with the amine-containing humate solution in an amount at least sufficient to neutralize all of the alkali metal or ammonium base used to prepare the humate solution; and thereafter the organophilic substituted ammonium humate derivative is recovered.

9 Claims, No Drawings

PROCESS FOR MAKING ORGANOPHILIC HUMATE DERIVATIVES

FIELD OF THE INVENTION

The invention relates to methods for the manufacture of organophilic amine derivatives of complex phenolic compounds.

PRIOR ART

In the drilling of wells for oil and gas by the rotary method, it is common to use a circulating fluid which is pumped down to the bottom of the well through a drill pipe, where the fluid emerges through ports in the drilling bit. The fluid rises to the surface in the annular space between the drill pipe and the walls of the hole, and at the surface it is treated to remove cuttings and the like and to prepare it for recirculation into the drill pipe. The circulation is substantially continuous while the drill pipe is rotated.

An important feature of oil base well working fluids of the class described is their ability to resist filtration. In most instances when they are in actual use, whether as drilling fluids, packer fluids, fracturing or completion fluids, the well working fluid is in contact with a more or less permeable formation, such as, for example, sandstone, sandy shale and the like, with an effective balance of pressure such that the fluid tends to be forced into the permeable formation. When a well working fluid is deficient in its ability to resist filtration, then the solids in the fluid are held back by the permeable formation and build up as a filter cake or sludge on its surfaces, while the liquid per se of the well working fluid filters into the permeable formation. The filter cake or sludge thus formed is generally very undesirable. Moreover, the loss of oil to the formation is very expensive, not only because of the cost of the oil itself, but also due to the cost of maintaining the properties and composition of the fluid.

Various additives have been used or suggested for use as fluid loss additives to prevent or decrease this loss of fluid by filtration from oil base muds. Some of the first materials used for this purpose were asphalt and various modified asphaltic materials. The following U.S. patents all disclose various amine derivatives of various polyphenolic compounds for use as fluid loss additives (hereinafter sometimes referred to as FLA) for oil base muds: Jordan et al. U.S. Pat. No. 3,168,475; Jordan et al. U.S. Pat. No. 3,281,458; Beasley et al. U.S. Pat. No. 3,379,650; Cowan et al. U.S. Pat. No. 3,232,870; Cowan et al. U.S. Pat. No. 3,425,953; Andrews et al. U.S. Pat. No. 3,494,865; Andrews et al. U.S. Pat. No. 3,671,427; Andrews et al. U.S. Pat. No. 3,775,447; Kim U.S. Pat. No. 3,538,071; and Kim U.S. Pat. No. 3,671,428. These patents are incorporated herein by reference for all purposes.

Jordan et al. U.S. Pat. No. 3,168,475 and U.S. Pat. No. 3,281,458 disclose certain substituted ammonium salts of humic acid. Compounds useful in the practice of their invention can be represented by the formula

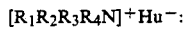

wherein at least one of the R's is an alkyl radical having from 12 to 22 carbon atoms in a straight chain, and in which those R's which do not have from 12 to 22 carbon atoms in a straight chain are chosen from the group consisting of hydrogen, alkyl radicals having fewer than 12 carbon atoms, phenyl, and benzyl; wherein $Hu^-$ is the anion of humic acid; wherein the term "alkyl" includes unsaturated alkyl chains, such as, for example, oleyl as well as stearyl; and wherein at least one of the alkyl radicals having from 12 to 22 carbon atoms may be attached to the nitrogen atom indirectly through an intermediate linkage, most generally a heterocylic carbon-nitrogen ring.

Beasley et al. U.S. Pat. No. 3,379,650 discloses various additives (dispersants) which facilitate the dispersion of long chain alkyl ammonium humates in organic liquids. Such humates are more readily dispersible in some organic liquids than in others. The dispersibility of these humates is also dependent to some extent on their processing during manufacture. Thus drying these long chain alkyl ammonium humates decreases their dispersibility.

Andrews et al. U.S. Pat. No. 3,494,865 discloses an adduct prepared by reacting humic acid with from about 50% to about 110% of its base-combining capacity, with certain fatty acid partial amides of a polyalkylene polyamine. As stated therein at column 3, lines 10–12. "The adduct as described and wherein the partial amide is present to the extent of about 110% of the base-combining capacity of the humic acid probably represents salt formation for 100%, the remaining 10% being adsorption, although in view of the complicated nature of the constituents, exact structural analysis is difficult and somewhat undertain. Also, depending on the drying temperature, where heat is used for such a step, the adduct may undergo a certain extent of amidification where the amine groups of the polyamines are combined with the carboxyl groups of the humic acid." Andrews et al. discuss the dispersion of such adducts in well working fluids and further discloses certain dispersants which are desirable to expedite the dispersion of the adducts without depending on down-hole circulation of the well working fluids.

Andrews et al. U.S. Pat. No. 3,671,427 discloses certain adducts of humic acid and a fatty acyl partial amide of a polyalkylene polyamine wherein the partial amide is linked to the humic acid by an amide linkage.

Beasley et al. U.S. Pat. No. 3,325,537 discloses certain salts for solubilizing lignite in water to achieve a solublization of at least 65% by weight and at the same time obtain a resulting pH within the limits of 5.2 to 7.5. Such lignite solutions are disclosed to be useful in preparing long chain alkyl ammonium humates.

Generally speaking, the substituted ammonium humates disclosed in these prior art patents may be produced by bringing together humic acid and the substituted ammonium compound in its base form. The base and the acid neturalize each other with salt formation to produce the desired humate derivative. Another general method of preparation disclosed is to convert the humic acid to a simple salt by reaction with an alkali, so as to produce sodium humate, potassium humate, ammonium humate, and the like, by reaction with alkali metal or ammonium bases, respectively. The substituted ammonium compound is caused to be present in the form of a simple salt or in quaternary ammonium form. Thus the free amine groups may be reacted with a simple acid such as hydrochloric, acetic, and the like to give the corresponding substituted ammonium chloride or acetate, respectively. This method of procedure is stated to have the advantage that the substituted ammonium salts and quaternary ammonium salts, and the simple humates as described are both water soluble, so that solutions of each reactant may be made, and the reaction completed by mixing solutions thereof together. Mixtures of water with methanol, ethanol, isopropanol, acetone, and the like may be needed for some substituted ammonium salts and quaternary ammonium salts.

I have found that the prior art method for preparing organophilic humate derivatives wherein the humic acid containing material and the substituted ammonium compound in base form are reacted together produces organophilic humate derivatives which are inefficient high temperature fluid loss control additives for oil base drilling fluids. The amount of substituted ammonium compound which can be reacted with the humic acid under these conditions is insufficient to react with all of the acidic functional groups of the humic acid.

I have further found that the prior art method for preparing organophilic humate derivatives wherein the humic acid containing material is converted to a water soluble or colloidally dispersible humate salt and subsequently reacted with a substituted ammonium compound in the form of an acid salt or quaternary ammonium salt suffers from several disadvantages, i.e., (a) many substituted ammonium salts are not water soluble and a polar organic solvent such as an alcohol, ketone, and the like must be added to the salt in order for the substituted ammonium salt to properly react with the humate salt. The use of such solvents is expensive and creates disposal problems when it is removed from the product, as by filtration, drying, and the like; (b) as noted in Beasley et al. U.S. Pat. No. 3,325,537, an excessive amount of substituted ammonium salt must be used to precipitate the humate salt when the pH of the humate solution is greater than 7.5; (c) the humate salt and the substituted ammonium salt commence reaction as soon as the substituted ammonium salt is mixed with the humate solution. As the precipitation of the organophilic humate derivative proceeds, some of the reactive sites on the humate become unavailable for reaction resulting in a sorption of the substituted ammonium salt onto the reacted ammonium humate derivative; and (d) filtration of the precipitated organophilic humate derivative is poor when utilizing as the substituted ammonium salt an amino-amide compound of the types disclosed in Andrews et al. U.S. Pat. Nos. 3,494,865; 3,671,427; and 3,775,447.

I have now found a process for the preparation of organophilic humate derivatives which overcomes the disadvantages of the prior art processes and which produces efficient fluid loss control additives in oil base drilling fluids. These additives impart excellent high temperature filtration control characteristics to oil base drilling fluids.

SUMMARY OF THE INVENTION

The process of my invention comprises: preparing an aqueous humate solution; mixing with the humate solution an amine containing at least one functional group per molecule selected from the group consisting of primary amino ($NH_2-$), secondary amino ($-NH-$), quaternary ammonium

or mixtures thereof; mixing with this amine containing humate solution an acid in an amount sufficient to at least neutralize all of the base used in preparing the aqueous humate solution; and thereafter recovering an organophilic ammonium humate; wherein the temperature of the amine containing humate, solution is at least about 100° F. (37.8° C.).

Accordingly, it is an object of this invention to provide an improved process for the preparation of organophilic humate derivatives which are useful as additives to control the fluid loss from oil base drilling fluids.

It is another object of this invention to provide a process for the preparation of organophilic ammonium humate derivatives in which the humic acid and the ammonium compound are more uniformly reacted.

It is yet another object of this invention to provide a process for the preparation of organophilic ammonium humates which requires no polar organic solvents.

These and other objects of this invention will be apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

The novel process of my invention for preparing organophilic humate derivatives comprises: (a) dispersing a humic acid-containing material in water with an alkali metal or ammonium base to produce a humate solution; (b) mixing with the humate solution an amine containing at least sixteen carbon atoms and at least one functional group per molecule selected from the group consisting of primary amino, secondary amino, quaternary ammonium, or mixtures thereof; (c) mixing with said amine containing humate solution an acid in an amount sufficient to at least neutralize all of the alkali metal or ammonium base; and (d) thereafter recovering the organophilic ammonium humate; wherein the temperature of the amine containing humate solution is above about 100° F. (37.8° C.).

Humic acid is a material of wide distribution and is present in soils, peat, and coals, particularly lignite or brown coal, and most particularly in the soft brown coal known as a leonardite. Humic acids are complex organic molecules that are formed by the breakdown of organic matter. Their exact structures are unknown, and they are extremely variable. The principal organic groups present are phenolic and carboxylic OH, aliphatic CH, carbonyl, conjugated carbonyl or aromatic CH$_2$ or CH$_3$ or ionic carboxyl, and possibly others. The average molecular weight of the humic acids is between 5,000 and 50,000. They have no x-ray or electron diffraction patterns and are therefore presumably amorphous.

The humic acids have a large cation exchange capacity which varies from 200 to 500 milliequivalents per 100 grams at pH7 depending on the humus source. Humic acids are colloids. When the cation exchange sites on the humic molecule are filled predominantly with other than hydrogen, the material is called humate. The humates of monovalent inorganic and ammonium ions are soluble in water, but the humates of multivalent cations are insoluble.

The term humic acid is used herein to include all of the colloidal acids derived from humus, including humic acid, ulmic acid and fulvic acid. Humic acid is soluble in alkali but insoluble in acid, methyl ethyl ketone, and methyl alcohol. Ulmic acid is soluble in alkali and methyl etyl ketone but insoluble in methyl alcohol. Fulvic acid is soluble in alkali, methyl ethyl ketone and methyl alcohol. The term humic acid is also intended to mean humic acids which have been further oxidized to increase their carboxyl content. See for example, "Chemistry of Brown Coals. IV. Action of Oxygen in Presence of Alkali", R. A. Durie and S. Sternhill, Australian Journal of Applied Science, 9, No. 4, 360-369, 1958.

While humic acid is present in soils and peat, and may be extracted from them, for example, with dilute aqueous alkali, it is preferred to obtain humic acid for the purposes of this invention in the form of lignite of high alkali solubility, of which vast deposits are found throughout the world, including particularly, the United States, for example, in North Dakota, Montana, Texas, New Mexico, and California. While I do not mean to be limited thereby, I prefer a humic acid source having a solubility in dilute, aqueous sodium hydroxide of at least 65% by dry weight, preferably at least 75%, as this provides a reasonable compromise between cost and efficacy in the final product.

The amino compounds which may be used in this invention include polyamines or polyamidoamines which contain at least one primary or secondary amine group per molecule and at least 16 carbon atoms selected from the group consisting of (I), (II), (III), and mixtures thereof:

$$R-NR'-(C_xH_{2x}NR')_yH \quad (I)$$
$$R''-CO-NH-(C_xH_{2x}NR')_zH \quad (II)$$

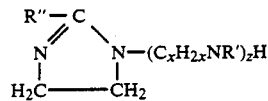
(III)

where $2 \leq x \leq 3$; $y \geq 1$; $z \geq 2$; R is an aliphatic group containing from 12 to 30 carbon atoms; R' is selected from the group consisting of H and R''—CO, and mixtures thereof; R'' is an aliphatic group containing from 11 to 29 carbon atoms; and wherein at least one of the R' groups are H.

The amine compound may also be a quaternary ammonium compound obtained by quaternizing the above compounds such that the H atoms are replaced with an alkyl group containing 1 to 3 carbon atoms, a benzyl group, or mixtures thereof, and excess of the quaternizing reagent is used sufficient to effect the quaternization of the amino group.

Preferably x=3 in the compounds represented by formula I and x=2 in the compounds represented by formulas II and III. Preferably $1 \leq y \leq 7$, $2 \leq z \leq 8$, R is an alkyl group containing from 12 to 22 carbon atoms, and R'' is an alkyl group containing from 11 to 21 carbon atoms. Most preferably at least 65% of the aliphatic radicals represented by R contain 18 carbon atoms, and at least 65% of the aliphatic groups represented by R'' contain 17 carbon atoms. Still more preferably the R'' group is derived from tall oil fatty acid.

The amino compound may also be a quaternary ammonium compound having the molecular formula (IV), and mixtures thereof with compounds (I), (II), and (III).

$$(R_1R_2R_3R_4N)^+(1/nA'')^- \quad (IV)$$

where $R_1$, $R_2$, $R_3$, and $R_4$ are independently selected from the group consisting of H, lower alkyl groups containing from one to three carbon atoms, and higher aliphatic groups containing from 12 to 30 carbon atoms; and where A is a charge balancing anion of valence n.

Preferably at least two of the $R_1$, $R_2$, $R_3$, and $R_4$ groups contain at least 16 carbon atoms, and the anion is chloride.

In the foregoing as well as elsewhere in this specification and the claims which follow, the term aliphatic is to be understood as including unsaturated as well as saturated (alkyl) straight carbon chain radicals, and straight carbon chain radicals which contain one or more hydroxyl or amino groups substituted therein.

By way of further explanation of the nature and types of the amino compounds utilized in the present invention are some typical members of the series in the following table, although these are merely illustrative and not at all by way of limitation.

GROUP I

R—NH—C$_3$H$_6$NH$_2$

R—NH—C$_3$H$_6$—NH—C$_3$H$_6$—NH$_2$

R—NH—C$_3$H$_6$—NH—C$_3$H$_6$—NH—CO—R''

R—NH—C$_2$H$_4$—NH—C$_2$H$_4$—NH$_2$

R—NH—C$_2$H$_4$—NH—C$_2$H$_4$—NH—CO—R''

R—NH—C$_2$H$_4$—NH—C$_2$H$_4$—N(COR'')—C$_2$H$_4$—NH—CO—R''

R—NH—C$_3$H$_6$—N(CO—R'')—C$_3$H$_6$—NH—C$_3$H$_6$—NH—CO—R''

GROUP II

R''—CO—NH—C$_2$H$_4$—NH—C$_2$H$_4$—NH$_2$

R''—CO—NH—C$_2$H$_4$—NH—C$_2$H$_4$—NH—C$_2$H$_4$—NH—CO—R''

R''—CO—NH—C$_2$H$_4$—NH—[C$_2$H$_4$—N(CO—R'')-]$_2$—C$_2$H$_4$—NH$_2$

R''—CO—NH—(C$_2$H$_4$—NH)$_2$—[C$_2$H$_4$—N(-CO—R$_2$'')]$_2$H

R''—CO—NH—(C$_2$H$_4$—NH)$_3$—[C$_2$H$_4$—N(-CO—R'')]$_2$H

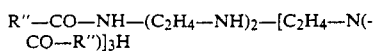

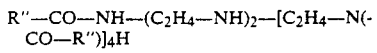

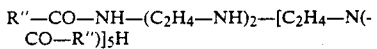

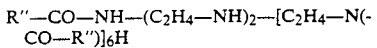

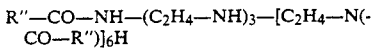

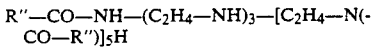

GROUP III

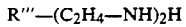

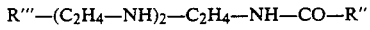

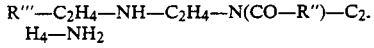

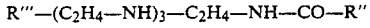

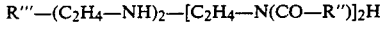

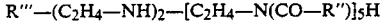

where R''' is the imidazoline group

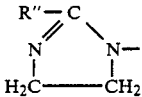

The preferred amino compounds for use in this invention are the fatty acyl partial amides, which may also be called fatty acid amido amines, from Group II which result from the reaction of fatty acids with polyalkylene polyamines. The preferred fatty acids contain from 12 to 22 carbon atoms, preferably from 14 to 18 carbon atoms. The preferred polyalkylene polyamines are polyethylene polyamines having from 3 to about 9 amino groups, and thus includes tri-amines such as diethylene triamine, tetra-amines such as triethylene tetramine, pentamines such as tetraethylene pentamine, and higher analogs of these, up to nine and more amino groups. The amide is only partial, that is, it is such that from about one-fourth to about three-fourths of the nitrogen atoms are present in the form of a fatty acid amide, the balance being in the form of free amino groups.

Most preferably the fatty acid is selected from the group consisting of tall oil fatty acid, hydrogenated tallow fatty acid, and mixtures thereof. The preferred fatty acyl partial amides of Group II have an average equivalent weight per amino group in the range from about 235 to about 850.

Mixtures of one or more of the amino compounds from Group I, Group II, or Group III with one or more quaternary ammonium compounds from Group IV are very desirable organophilic humate derivatives for use in oil base drilling fluids.

The base used to prepare the aqueous humate solution must be an alkali metal or ammonium base as all other metallic humate salts are insoluble and non-colloidal. The term "solution" as used herein to describe the "humate solution" is intended to mean not only completely solubilized humate but also colloidally dispersed humate. The preferred bases for use in the present invention are sodium bases, most preferably sodium hydroxide, sodium tetraborate (borax), and mixtures thereof. Other bases which may be used include sodium carbonate, sodium silicate, the various sodium phosphates, the various condensed sodium phosphates, potassium hydroxide, potassium carbonate, ammonium hydroxide, and mixtures thereof with one another and with sodium hydroxide and/or sodium tetraborate.

The acids useful in the practice of my invention are preferably inorganic acids, most preferably selected from the group consisting of hydrochloric acid, sulfuric acid, nitric acid, and mixtures thereof. The most particularly preferred acids are hydrochloric acid and sulfuric acid. Other acids which may be used include acetic acid, hydroxy acetic acid, and the like.

The amount of amine added to the aqueous humate solution to react with and precipitate the humate on addition of the acid must be sufficient to produce an organophilic humate derivative after drying which is an effective fluid loss additive in oil base drilling fluids. Generally, an amount of amine in the range from about 95% to about 170% by weight of the humic acid (i.e., from about 80% to about 120% by weight of the humic acid-containing material) must be used, preferably from about 100% to about 150% by weight of the humic acid (i.e. from about 90% to about 110% by weight of the humic acid-containing material).

In the process of my invention the humic acid or humic acid-containing material is first solublized or dispersed in water with the alkali metal or ammonium base to form an aqueous humate solution. An amount of base is used to provide a pH in the range from about 7.0 to about 12.0, preferably greater than about 7.5. Generally the humic acid-containing material is ground to a fine particle size, preferably less than 60 mesh, and mixed with water to which the base has been added. The order of addition of the water, humic acid, and base does not appear to be critical, although more foaming is noted if the lignite and base are first reacted before addition of the water. The concentration of humic acid-containing material is not critical in this step as long as the humate solution can be easily mixed. However, upon addition of the acid to the amine containing humate solution in a subsequent step of this process, the solution becomes very viscous. A solid, gummy mass is obtained if the concentration of humic acid-containing material is greater than about 15% by weight in the humate solution.

The humate solution can be prepared at ambient temperature or above. However, the time required to effectively solublize the humic acid is decreased as the temperature is increased. Inasmuch as the temperature of the amine containing humate solution must be at least 100° F. in a subsequent step, it is desirable to raise the temperature of the humate solution to at least 100° F. (37.8° C.), preferably from about 140° F. (60° C.) to about 185° F. (85° C.). At this temperature a mixing time of 15 to 30 minutes is sufficient to solublize the humic acid although longer heating time has no detrimental effect.

Once the humate solution is formed, the amino compound is then added. If the amino compound is selected from Group I, II, and III and it contains no quaternary ammonium radicals, no particular reaction is noted. The amino compound and humic acid (or humic acid-containing material) form a smooth, somewhat more viscous slurry in which the amino compound and humic acid are initimately and homogeneously mixed. The amino compound is most probably sorbed onto the humic acid at this stage of the process. If a quaternary ammonium compound is added at this stage, a reaction is evident as the humate solution becomes grainy and flocculent.

The temperature of the amine-containing humate solution must be at least 100° F. (37.8° C.), preferably in the range from about 140° F. (60° C.) to about 185° F. (85° C.).

Thereafter an acid is added to the amine-containing humate solution to decrease the pH causing an in-situ reaction to occur between the humate and the amine. As the acid is slowly added, the viscosity of the mixture slowly increases until a maximum viscosity is obtained when about 70%–80% by weight of the theoretical amount of acid required to neutralize the base used to solublize the humic acid is added. Thereafter the viscosity decreases as the remainder of the acid is added. The amount of acid added must be sufficient to at least neutralize all of the base used to solublize the humic acid. The pH of the substituted ammonium humate slurry will generally be in the range from 4.0 to 6.0 when the amount of acid is the theoretical amount required to neutralize the base.

Upon completion of the addition of the acid, the substituted ammonium humate must be recovered for use. Recovery procedures vary depending on the characteristics of the substituted ammonium humate produced. Generally the aqueous phase is removed by filtration and drying, and the organophilic humate derivative is then finely ground.

When sodium hydroxide or potassium hydroxide has been used to prepare the humate solution and the substituted ammonium humate derivative is prepared utilizing high shear mixing, the substituted ammonium humate obtained is of very fine particle size and difficult to filter to remove the major proportion of the aqueous phase before drying. This results in long filtration times, low filter cake solids, and, hence, extra processing expenses. Thus it is desirable to spray dry or otherwise directly dry this substituted ammonium humate slurry. The organophilic ammonium humate derivative obtained is a very fine powder which imparts excellent fluid loss control at high temperatures in oil base drilling fluids.

When less basic materials are used to prepare the humate solution, such as sodium tetraborate, or the substituted ammonium humate derivative is prepared utilizing low shear mixing, the substituted ammonium humate slurry may be filtered prior to drying and grinding to recover the organophilic humate derivative.

The rate of filtration is dependent on many variables such as the ratio of the amine to humic acid, the amount of base and the type of base used to prepare the humate solution, and the amount of acid added to the amine containing humate solution.

I have found, however, that the rate of filtration and the percent filter cake solids can be increased by adding more acid to decrease the pH to less than about 4.0, preferably in the range from about 2.0 to about 3.5. Decreasing the pH of the amine containing humate solution to this pH provides a larger particle size product which is more readily filterable.

In another embodiment of this invention, I have found that the pH of the acidified solution can be raised by the addition of lime without adversely effecting the rate of filtration. Indeed, in some cases the rate of filtration is favorably increased. The lime produces an organophilic humate derivative which has better initial dispersibility in diesel oil (the basic oil used in the preparation of oil base drilling fluids). Cowan in U.S. Pat. No. 4,421,655, incorporated herein by reference, discloses a complex salt of a amino compound, humic acid, and a polyvalent metallic cation such as calcium as a fluid loss additive in oil base drilling fluids. It is possible that a complex of this type containing a higher concentration of substituted ammonium compound can be prepared by the process of this invention. An amount of lime sufficient to raise the pH to 6.0–8.0 is preferred.

The following non-limiting examples illustrate the results and benefits obtainable utilizing this process for the preparation of organophilic humate derivatives. In the examples, all percentages are by weight unless otherwise indicated. The amido-amines (partial amides) which were evaluated were obtained by reacting tall oil fatty acid, containing 3% rosin acids, with a polyamine at a temperature of 205°±5° C. for one hour. The number of equivalents of tall oil fatty acid per equivalent of amine is indicated by the numerical fraction, i.e., Partial Amide 0.7 indicates that this partial amide contains 0.7 equivalents of tall oil fatty acid per equivalent of amine.

EXAMPLE 1

50 parts of lignite, dry basis (66.8 parts as received) were mixed with 150 parts of hot water and 7.5 parts of sodium hydroxide in a Waring Blendor for five minutes. Thereafter 55 parts of Partial Amide 0.7 prepared from tetraethylene-pentamine were added and mixed for 2 minutes. 18.5 parts of concentrated hydrochloric acid (37% HCl) were then added followed by 130 parts of additional hot water and mixed for 5 minutes at 120° F. (48.9° C.). 2.5 parts of hydrated lime were added and mixed for two minutes. This fine particle size fluid sample obtained before drying contained 24.5% substituted ammonium lignite. The slurry was then dried at 150° F. and the organophilic lignite ground to a fine powder.

EXAMPLE 2

The procedure of Example 1 was repeated except 45 parts of the Partial Amide 0.7 were used.

EXAMPLE 3

The procedure of Example 1 was repeated except 35 parts of the Partial Amide 0.7 were used.

COMPARATIVE EXAMPLE 2

The procedure of Example 2 was repeated except that the sodium hydroxide and hydrochloric acid were deleted. Thus this process is as described in the prior art wherein the humic acid-containing material is reacted with the substituted ammonium compound in its base form. As the mixing continued following the addition of the 130 parts of hot water, the slurry became a semi-solid mass which completely stopped the Blendor. After drying at 150° F. a gummy solid was obtained which could not be ground.

COMPARATIVE EXAMPLE 3

The procedure of Example 3 was repeated except that the sodium hydroxide and hydrochloric acid were deleted, as in Comparative Example 2. As the mixing continued following the addition of the 130 parts of hot water, the solids began to clump and very poor mixing resulted. After drying at 150° F. a gummy solid was obtained which could not be ground.

COMPARATIVE EXAMPLE 2A

The procedure of Comparative Example 2 was repeated except that a low shear mixer was used instead of a Waring Blendor. A sticky, semi-solid material was obtained which was dried at 150° F. A gummy solid was obtained which could not be ground.

EXAMPLE 4

The procedure of Example 1 was repeated except that 11.25 parts of glacial acetic acid were used instead of the hydrochloric acid.

EXAMPLE 5

50 parts of humate, dry basis, as described in Firth U.S. Pat. No. 4,235,727 (270 parts as received at 18.5% solids) was used as a substitute for lignite in the procedure of Example 1.

EXAMPLE 6

The procedure of Example 1 was repeated except that 75 parts of the Partial Amide 0.7 were used and the lime was omitted.

EXAMPLE 7

The procedure of Example 1 was repeated except that the lime was omitted.

COMPARATIVE EXAMPLE 7

50 parts of lignite, dry basis (66.8 parts as received) were mixed with 150 parts hot water and 7.5 parts sodium hydroxide in a Waring Blendor for five minutes. In a separate Waring Blendor jar there were mixed 130 parts of hot water, 18.5 parts of concentrated hydrochloric acid (37% HCl) and 55 parts the Partial Amide 0.7. The lignite solution was added to the Blendor jar containing the HCl and Partial Amide 0.7 and mixed 7 minutes. The slurry was then dried at 150° F. and the organophilic lignite ground to a fine powder.

This process is as described in the prior art wherein a humate solution is reacted with an acid salt of the substituted ammonium compound except that the amount of acid used is the amount used in the presently disclosed process, i.e. an amount of acid sufficient to react with all of the base used in preparing the humate solution. The amount of concentrated hydrochloric acid needed to form a salt with the excess amine groups in the Partial Amide 0.7 is only 7.5 parts.

EXAMPLE 8

An aqueous humate solution was prepared containing 1110 parts hot water, 48.2 parts of sodium tetraborate decahydrate, 31.87 parts of Texas lignite (containing 24% moisture), and 95.63 parts North Dakota lignite (containing 18% moisture) by mixing with a low shear mixer for five minutes. The temperature of the humate solution was maintained in the range from 150° F. to 170° F. 40.2 parts of dimethyl dihydrogenatedtallow ammonium chloride (75% active) and 91.8 parts of Partial Amide 0.5 prepared from tetraethylenepentamine were added and mixed for 5 minutes. The pH was 7.6. Thereafter 60.8 parts of 20% sulfuric acid was slowly added and mixed 5 minutes. The pH was 4.0. 24 parts of lime were then added and mixed five minutes. The substituted ammonium humate was then filtered in a Buchner funnel and the time for the filter cake to show was measured as an indication of the relative filtration rate. The slurry thus took 3.75 minutes for filtration.

EXAMPLE 9

The procedure of Example 8 was repeated except that 80 parts of 20% sulfuric acid was used. The pH was 3.0 and the filtration time was 1.87 minutes.

EXAMPLE 10

An aqueous humate solution was prepared containing 425 parts hot tap water, 7.5 parts sodium hydroxide, and 68.6 parts of a lignite (27.1% moisture, 79% humic acid (dry basis)) by mixing at low shear for 15 minutes at 175°-185° F. 50 parts of the Partial Amide 0.5 used in Example 8 were added and mixed for 5 minutes. 47 parts of 20% sulfuric acid were added and mixed 5 minutes. 2.5 parts of hydrated lime were added and mixed 5 minutes. The substituted ammonium humate slurry was then filtered as in Example 8, the product was then dried at 150° F. and ground. The filtration time of the slurry was 3 minutes.

EXAMPLE 11

The procedure of Example 10 was repeated using 66.5 parts of a lignite (24.8% moisture, 67% humic acid, dry basis). The filtration time was 2 minutes.

EXAMPLE 12

The procedure of Example 10 was repeated using 72.9 parts of a lignite containing 31.4% moisture and 55% humic acid, dry basis. The filtration time was 15 minutes.

EXAMPLE 13

The procedure of Example 10 was repeated using 68.0 parts of a lignite containing 26.5% moisture and 68% humic acid, dry basis. Various partial amides were used as indicated in Table 1.

TABLE 1

| Example | Filtration Time Minutes | Partial Amide Equivalents TOFA[(1)]: Polyamine | Polyamine |
|---|---|---|---|
| 13A | 2.5 | 0.5 | Diethylenetriamine |
| 13B | 1.5 | 0.5 | Triethylenetetramine |
| 13C | 2.0 | 0.5 | HPA No. 2 (Higher polyamines) |
| 13D | 18.0 | 0.7 | Diethylenetriamine |
| 13E | 40.0 | 0.7 | Triethylenetetramine |
| 13F | 50.0 | 0.7 | HPA No. 2 |

[(1)]Tall oil fatty acid

EXAMPLE 14

The procedure of Example 8 was repeated using 42 parts of sodium tetraborate pentahydrate, 37.5 parts of Texas lignite, dry basis, 112.5 parts of North Dakota lignite, dry basis, 45 parts of dimethyl dihydrogenated-tallow ammonium chloride (75% active in isopropanol), and 96 parts of a Partial Amide 0.7 prepared from HPA No. 2 higher polyethenepolyamines which had been quaternized with benzyl chloride. The sample filtered very fast, less than one-half minute.

EXAMPLE 15

An aqueous solution of sulfonated humic acid was prepared by refluxing a mixture containing 425 parts water, 7.5 parts sodium hydroxide, 5.0 parts sodium sulfite, and 50.0 parts lignite, dry basis at 100°-105° C. for 3 hours. This process is disclosed in U.S. Pat. No. 3,700,728, incorporated herein by reference. 55 parts of the Partial Amide 0.5 from tetraethylene-pentamine were added and mixed at low shear for 5 minutes at 170°-180° F. 89 parts of 20% sulfuric acid were added and reacted 5 minutes. The substituted ammonium sulfonated lignite slurry was filtered, dried at 150° F., and ground.

EXAMPLE 16

The procedure of Example 10 was repeated except that the amount of sulfuric acid was varied and the pH and filtration time measured. No lime was added to these substituted ammonium humate slurries. The data obtained are given in Table 2.

TABLE 2

| Example | Parts 20% $H_2SO_4$ | pH | Filtration Time Minutes |
|---|---|---|---|
| 16A | 45.9* | 5.0 | 4.33 |
| 16B | 67.1 | 3.6 | 3.25 |
| 16C | 77.7 | 3.0 | 2.17 |
| 16D | 88.7 | 2.5 | 1.83 |

*Amount required to neutralize the NaOH in the slurry.

COMPARATIVE EXAMPLE 16

The procedure of Example 16 was repeated except that the amount of acid added was 36.8 parts, the theoretical amount required to react with the Partial Amide 0.5 to form the amine salt. The pH was 6.2 and the filtration rate was 9.5 minutes.

Several of the organophilic lignite samples were evaluated by mixing 10 grams of each sample in 350 ml. of diesel oil for 5 minutes on a Waring Blendor. Thereafter the fluids were tested for fluid loss according to the API RP 13B procedure. The results are given in Table 3.

TABLE 3

| Evaluation of Organophilic Lignites as Fluid Loss Control Additives in Diesel Oil | |
|---|---|
| Organophilic Humate of Example | API Fluid Loss, ml. |
| 1 | 6.5 |
| 2 | 6.0 |
| 3 | 41.0 |
| 4 | 4.5 |
| 5 | 25.0 |
| 6 | 6.5 |
| 7 | 10.0 |
| Comparative 7 | No Control |
| 10 | 9.5 |
| 12 | 17.0 |
| 13A | 11.0 |
| 13B | 11.0 |
| 13C | 4.0 |
| 13D | 4.0 |
| 13E | 2.5 |
| 13F | 4.0 |
| 14 | 7.0 |
| 15 | 6.0 |
| 16A | 8.5 |
| 16B | 7.5 |
| 16C | 9.0 |
| 16D | 7.5 |
| Comparative 16 | 9.5 |

As indicated by the results of Example 15, sulfonated humic acids or sulfonated humic acid-containing materials can be used in the process of the invention. Thus the term "humic acid" or "humic acid-containing material" is intended herein and in the appended claims to include the sulfonated derivatives of humic acid or humic acid-containing materials.

Other polyphenolic acids or salts thereof may be useful in the process of the invention. Thus lignosulfonic acid; modified polyphenolic condensates; modified tannins; the oxidized, sulfonated, and sulfomethylated derivatives of these polyphenolic compounds; and the water soluble salts of these polyphenolic compounds or these derivatives may be useful in this process. The following U.S. patents all disclose various polyphenolic compounds which may be used to practice this invention: U.S. Pat. No. 2,831,022—sulfonated tannins; U.S. Pat. No. 3,232,870—lignosulfonates; U.S. Pat. No. 3,391,173—sulfomethylated tannins; U.S. Pat. No. 3,639,263—HCN modified lignosulfonates; U.S. Pat. No. 3,671,428—oxidized lignosulfonates; U.S. Pat. No. 3,700,728—sulfonated humic acids, lignite and oxidized coals; U.S. Pat. No. 3,726,850—ozone oxidized lignins; U.S. Pat. No. 3,956,140—sulfonated lignite, sulfonated phenolic condensates, and sulfomethylated phenolic condensates; U.S. Pat. No. 4,069,034—humic acids; U.S. Pat. No. 4,088,640—ozone oxidized lignosulfonates; and U.S. Pat. No. 4,196,777—oxidized lignosulfonates.

I claim:

1. A process for preparing organophilic humate derivatives which comprises:
   (a) dispersing a humic acid-containing material in water with an alkali metal or ammonium base to produce a humate solution having a pH in the range from about 7.0 to about 12.0, the concentration of said humic acid-containing material being less than about 15% by weight of said humate solution;
   (b) mixing with the humate solution, in an amount at least 70% by weight based on the dry humic acid-containing material, a partial amide having the structural formula $$R''-CO-NH'(C_xH_{2x}NR')_zH$$

where $2 \leq x \leq 3$; $z \geq 2$; R' is selected from the group consisting of H and R''—CO, and mixtures thereof; R'' is an aliphatic group containing from 11 to 29 carbon atoms; wherein at least one of the R' groups are H;
   (c) mixing with said partial amide containing humate solution an acid in an amount sufficient to at least react with all of said alkali metal or ammonium base and produce a pH in the range from about 4.0 to about 6.0; and
   (d) thereafter recovering the organophilic humate; wherein the temperature of the partial amide containing humate solution is above about 100° F.

2. The process of claim 1 wherein lime is added to the substituted ammonium humate slurry resulting from step (c) to raise the pH of the slurry to the range from about 6.0 to about 8.0.

3. The process of claim 1 wherein the amount of acid added in step (c) is greater than the theoretical amount required to react with said alkali metal or ammonium base.

4. The process of claim 3 wherein the pH of the acidified substituted ammonium humate slurry resulting from step (c) is in the range from about 2.0 to about 4.0.

5. The process of claim 1 wherein said alkali metal or ammonium base used to prepare the humate solution in step (a) is selected from the group consisting of sodium hydroxide, sodium tetraborate, and mixtures thereof.

6. The process of claim 1 wherein said acid is selected from the group consisting of hydrochloric acid, sulfuric acid, and mixtures thereof.

7. The process of claim 1 wherein the pH of the humate solution is greater than about 7.5.

8. The process of claim 1, 2, 5, 6, or 9 wherein said alkali metal or ammonium base is selected from the group consisting of sodium hydroxide, sodium tetraborate, and mixtures thereof; and wherein said acid is selected from the group consisting of hydrochloric acid, sulfuric acid, and mixtures thereof.

9. The process of claim 5, 6, 7, 8, or 9 wherein lime is added to the substituted ammonium humate slurry resulting from step (c) to raise the pH of the slurry to the range from about 6.0 to about 8.0.

* * * * *